April 11, 1961 A. W. H. PORTER 2,978,887
WARP KNITTING MACHINERY
Filed Aug. 6, 1956 7 Sheets-Sheet 1

Inventor
Allan W. H. Porter
By
Attorneys

April 11, 1961 A. W. H. PORTER 2,978,887
WARP KNITTING MACHINERY
Filed Aug. 6, 1956 7 Sheets-Sheet 2

Inventor
Allan W. H. Porter
By
Holcomb, Wetherill & Brestro
Attorneys

Fig. 6.

April 11, 1961  A. W. H. PORTER  2,978,887
WARP KNITTING MACHINERY
Filed Aug. 6, 1956  7 Sheets-Sheet 5

Inventor
Allan W. H. Porter
By
Holcomb, Wetherill & Brisbois
Attorneys

United States Patent Office 2,978,887
Patented Apr. 11, 1961

2,978,887

WARP KNITTING MACHINERY

Allan William Henry Porter, Burton-on-Trent, England, assignor to Hobourn-F.N.F. Limited Filed Aug. 6, 1956, Ser. No. 602,308

Claims priority, application Great Britain Aug. 24, 1955

6 Claims. (Cl. 66—86)

In flat warp knitting machines having a row of hooked knitting needles which reciprocate along the lines of their shanks and one or more rows of warp guides, or like members such as feeders, arranged parallel to the row of needles, a spearate guide eye is provided as a guide or feeder for each warp thread, and sinkers or like members for holding down the knitted loops are arranged in a row parallel to the row of needles, each sinker engaging between a pair of needles.

The guides or feeders swing to and fro across the plane of the row of needles, either betwen the needles or just above the hooks. The guides or feeders are also movable along the row across either the backs or fronts of the individual needles. The front of a hooked needle is that side of the needle in which the hook has an opening to receive a thread which is to be knitted. The front of the needle is usually provided with a tongue, a latch, or other similar member by which the opening of the hook is closed after a thread has been placed in the hook. The movement of a guide eye across the front of a needle, during which the warp thread is laid into the hook of the needle is known as lapping. The longitudinal movement of the guides and warp threads which usually takes place across the backs of the needles, and in which the threads are not laid into the hooks of the needles, is known as shogging. The pattern of the fabric knitted depends on the number of needles across which the warp threads are shogged, which may be five or sometimes even more. As a result of the shogging movement, each warp thread runs obliquely along the line of the row of needles from the guide eye to the space between the sinkers or like members accommodating the needle with which the thread was last engaged, and the greater the shog the more oblique the line of the thread becomes.

Each sinker has a knockover edge extending across the line of the row of needles substantially perpendicular to their shanks and a neb, which is a hook-shaped projection extending above the knockover edge. The sinkers reciprocate between the needles so that the nebs are moved to and fro from the front of the needles into and out of engagement between the warp threads to permit the fabric loop held by the nebs to be knocked over. Instead of sinkers, fixed trick plates may be used to provide knockover edges, the sinker nebs being replaced by reciprocating holding-down points or other like members. The holding-down points are moved to and fro into and out of engagement between the warp threads similarly to the sinker nebs.

In the usual knitting cycle for forming a stitch, the needle hooks move upwards from beneath the level of the knockover edges of the sinkers, the guides or feeders complete their shogging movement across the backs of the needles and then swing at right angles through the row of needles from the back to the front of the hooks, and each guide eye is then lapped across the front of one or more of the hooks. The guides then swing back again over or through the row of needles, thus laying a helix of thread in and around the hook of each needle. The threads run upwards from the course of stitches formed by the previous knitting cycle. The needles then move downwards and the hooks carry the helices of thread down, forming loops which are drawn down between the sinkers. Meanwhile, the nebs are withdrawn to the front of the needles releasing the fabric from beneath the nebs and the newly formed loops are drawn through the previous course of loops which are at the same time cast off the needles by the retraction of the needles below the knockover edges of the sinkers or trick plates.

At this point the guides or feeders start their next shogging movement and the threads are moved parallel to, but behind the row of needles. The threads are thus laid obliquely from the new course of loops held between the sinkers or trick plates by the needles, across the knockover edges to the guide eyes which are now in position for swinging back through the row of needles as the needles rise to start the next knitting cycle.

Previously the guides have been shogged when the sinkers are near the end of their movement to the front of the needles; that is, when the nebs or holding down points are withdrawn from between the warp threads. The threads thus slope from the knockover edges obliquely along the line of the row of needles to the guides, and when the nebs or holding-down points move back towards the line of the row of needles the points of the nebs or holding-down points, instead of engaging cleanly between the correct pairs of warp threads, tend to split the threads and the filaments which make up the threads or, in extreme cases when the shogging is very great, the nebs or holding-down points may even engage between the wrong pairs of threads. This splitting of the threads or mis-gating of the nebs is most likely to occur when knitting marquisette fabric structures. In the case of either splitting of the threads or mis-gating of the nebs, it is difficult or impossible to obtain the correct lay of the threads for the fabric.

According to the present invention the warp guides or like members are moved to and fro transversely to the row of needles twice during each complete cycle of movement of the needles so that the warp guides are in a position in front of the needles during two separate periods in each knitting cycle and move behind the needles between these periods and the warp guides are caused to make a lapping movement along the row of needles during one of these periods and a shogging movement during the other period, both the lapping and shopping movements thus taking place during the time that the warp guides or like members are in front of the needles and the sinker nebs or like members are in engagement between the warp threads.

Thus the threads run obliquely along the row of needles from the tops of the nebs or like members and not, as has previously been the case, from the knockover edges. Moreover, since the nebs or like members are already in engagement between the threads during and after shogging, it is impossible for the nebs either to split the threads or to engage between the wrong pairs as a result of the shog motion for the next course of stitch formation. Preferably the threads are lapped at or near the end of the first movement of the guides or feeders to the front of the needles, and are shogged at, or near the end of the second movement.

In the usual knitting cycle in which the guides or feeders move only once to and fro across the line of the row of needles it is necessary for the needle to have a dwell, that is to say, the needle should be substantially stationary near the uppermost end of its stroke during the time that the guides or feeders move from the back to the front of the row of needles, are lapped across one needle, and move back again. To obtain this dwell the needles may be driven through a pair of eccentrics operating in parallel, one rotating at twice the speed of the other. The guides or feeders and the sinkers may also be driven by a similar double eccentric arrangement. When, however, the guides or feeders are arranged to move twice to and fro across the line of the row of needles, it has been found that simple harmonic motion is acceptable for the needles and also the guides or feeders and the sinkers, all of which can thus be driven by single eccentrics, the frequency of the motion of the guides or feeders being twice that of the other knitting elements. These motions can be obtained from single eccentrics, the relative angular positions and throws of which are adjusted as necessary. The eccentrics driving the guides rotate at twice the speed of those driving the other knitting elements and in this way the compound motion of the knitting elements and the driving mechanism of the whole knitting machine is very much simplified.

In net or openwork fabrics having some stitches forming single wale open loop pillars, one or more rows of guide eyes make lapping and shogging movements such that each eye moves back and forth across a single needle in every knitting cycle. Consequently, the loops cannot be held down effectively around the shanks of the needles when the needles rise, because the loops are normally held down by engagement under the nebs, but when the thread does not pass from one needle along the row to another, it cannot pass under a neb, since the nebs lie between the needles.

It has previously only been possible to overcome this difficulty by employing additional shogging warp separators or point dividers of a type similar to those used in the original English Milanese machines in which the threads are displaced along the row of needles by these point dividers.

According to a further feature of the present invention the row of warp guides in which each guide makes a lapping movement across the same needle in every knitting cycle, is caused to make an additional shogging movement whilst the warp guides are behind the needles. This additional shogging movement occurs earlier in the knitting cycle than the shogging movement of the warp guides which takes place during the time that the warp guides are in front of the needles before the sinker nebs have moved out of engagement between the threads. The additional shogging movement is equal in length and opposite in direction to the shogging movement which takes place during the time that the warp guides are in front of the needles so that after the two movements have taken place the guides are in their initial positions along the row of needles. The same additional movement may be applied to any alternative member which may be substituted for the warp guides. This additional shogging movement causes the warp threads to lie obliquely across the upper edges of the sinker nebs or holding down points, which, at the time of the shogging movement, are in engagement between the threads so that, as the sinker nebs or holding-down points are withdrawn to allow the previously knitted course of stitches to be knocked over, the oblique threads will pass clearly under the adjacent sinker neb or holding-down point as the warp guides move towards the front of the needles. Wales are thus formed temporarily under and around the sinker nebs or holding-down points which hold down the loops formed around the needle. These temporary wales are cast off the sinker nebs or holding-down points when knock-over occurs in the following knitting cycle. The slackness in the threads due to the casting off of the wales may be taken up by movement of the tension bar with which flat warp knitting machines are usually equipped.

The movements of the guides or like members transversely to the row of needles may be substantially rectilinear or they may move along a substantially elliptical path in known manner.

An example of a warp knitting machine constructed in accordance with the invention is illustrated in the accompanying drawings, in which:

Figure 8 is a diagram showing the path of a single warp thread during successive knitting cycles of the type illustrated in Fig. 7a;

The knitting machine illustrated by way of example in the drawings is of the kind which has a row of reciprocating needles arranged side by side in a straight line. Each needle is formed with a tubular shank in which a tongue is situated. The tongues are reciprocated independently of the needles and so open and close the hooks of the needles during different parts of the knitting cycle.

Figure 1:
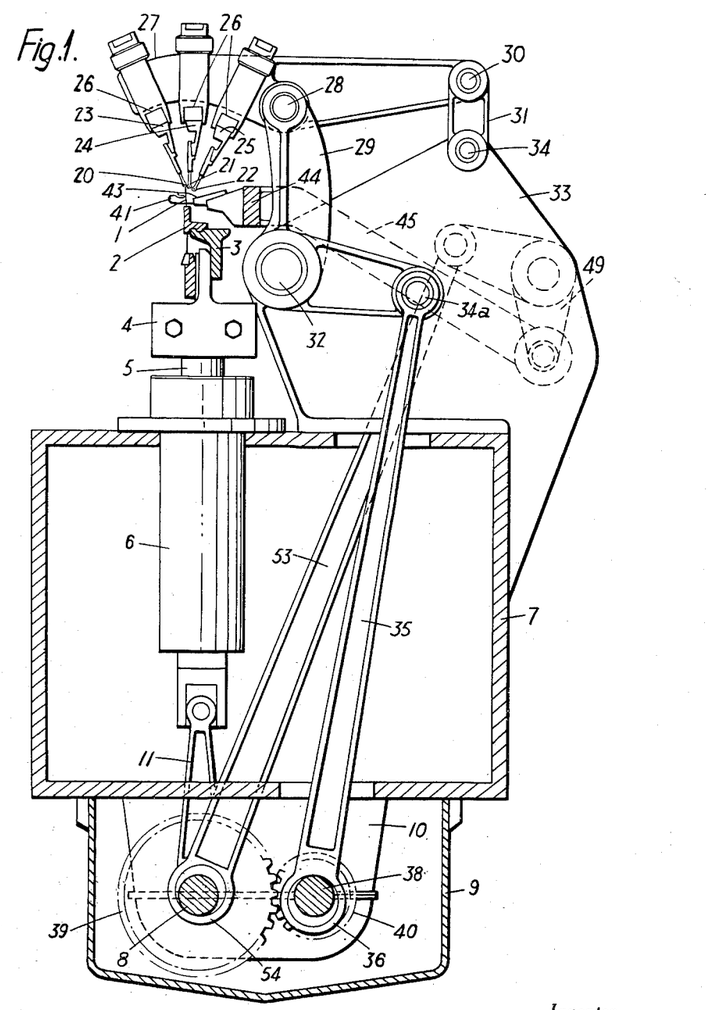
Figure 1 is a cross section through a part of the machine showing the knitting elements and their driving mechanisms.
Figure 2:
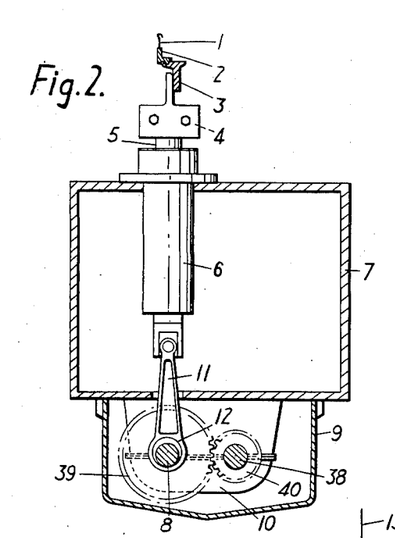
Figure 2 is a similar cross section to Figure 1, but to a smaller scale, and showing only the driving mechanism for the needles.

As shown in Figures 1 and 2 a row of needles 1 are arranged side by side and are fixed in a die-cast bar 2 which is clamped to a carrier 3 which extends along the whole width of the machine. The carrier 3 is supported at intervals along its length on brackets 4 which are mounted on rods 5. The rods 5 can slide vertically upwards and downwards in tubular guides 6 which are carried in a box-shaped bed 7. The box-shaped bed 7 extends across the whole width of the machine and from it all the knitting elements are supported. A main driving shaft 8 extends across the whole width of the machine within a sump 9 mounted below the bed 7. The driving shaft 8 is carried in bearing blocks 10 at intervals along its length. A connecting rod 11 connects the lower end of each of the rods 5 to an eccentric 12 on the shaft 8.

Figure 3:
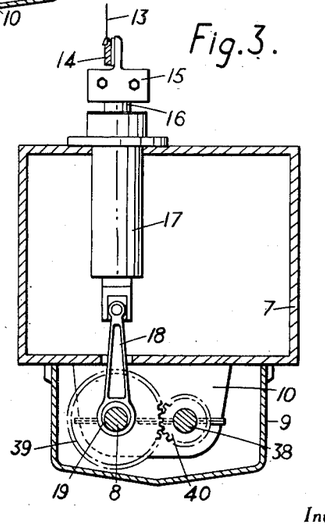
Figure 3 is a similar cross section to Figure 2 showing only the driving mechanism for the tongues.

As shown in Figure 3, tongues 13 which are arranged to reciprocate within the hollow shanks of the needles 1, are carried on a tongue bar 14. The tongue bar 14 is carried at intervals along its length on brackets 15 mounted on the upper ends of rods 16. The rods 16 are mounted so that they can slide vertically upwards and downwards in guides 17 and are connected by connecting rods 18 to eccentrics 19 on the shaft 8 in a similar manner to that in which the rods 5 are connected to the eccentrics 12.

Figures 4, 5:
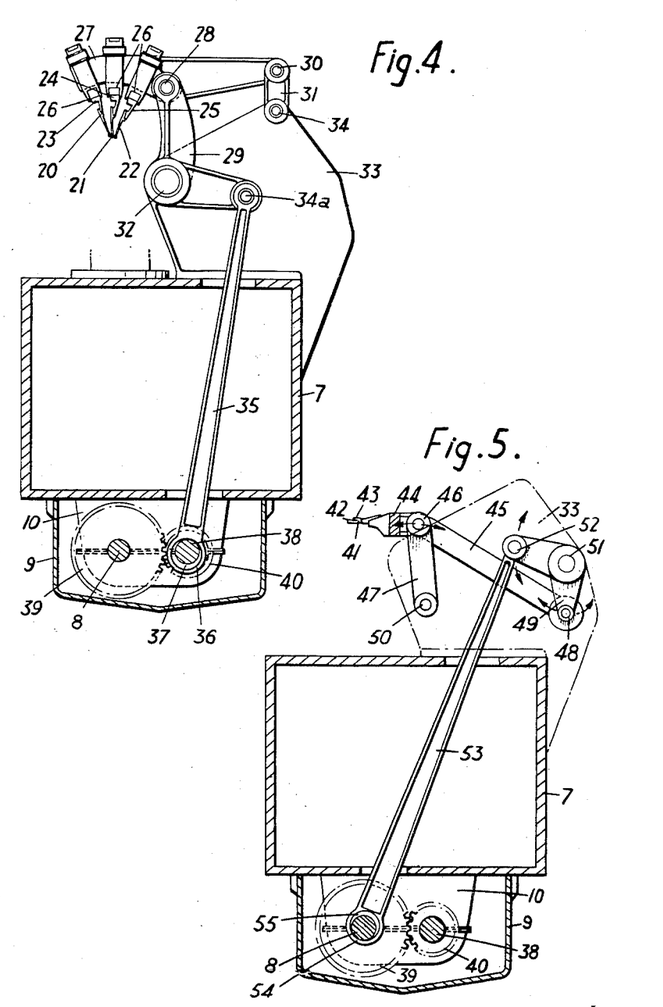
Figure 4 is a similar cross section to Figure 2 showing only the driving mechanism for the warp guides.
Figure 5 is a similar cross section to Figure 2 showing only the driving mechanism of the sinkers.

Three rows of warp guide eyes 20, 21 and 22 are carried on guide bars 23, 24 and 25 respectively. The guide bars 23, 24 and 25 are mounted in grooves 26 formed in arms 27. The guide bars 23, 24 and 25 are arranged to slide longitudinally along the length of the bed 7 in the usual way, their movement in this direction being controlled as is customary by pattern chain mechanism which may be of the type shown in U.S. Patent No. 2,155,145. Each arm 27 is connected by a pivot pin 28 to one arm of a bell crank lever 29 and also by a pivot pin 30 to a link 31. The bell crank levers 29 are pivoted by pins 32 to brackets 33 projecting upwards from the bed 7. The links 31 are connected to the same brackets 33 by pivot pins 34. The second arm of each of the bell crank levers 29 is connected by a pin 34a to a connecting rod 35. The lower end of each connecting rod 35 is formed with an eccentric strap 36 which embraces an eccentric 37 on a secondary driving shaft 38. The secondary driving shaft 38 is driven from the main driving shaft 8 through a pinion 39 fixed to the main shaft 8 which meshes with a second pinion 40 fixed to the secondary shaft 38. The pinion 39 has twice as many teeth as the pinion 40 so that the secondary shaft 38 is rotated at twice the speed of the main shaft 8.

Conventional sinkers 41 having knock-over edges 42 and nebs 43 are carried on a sinker bar 44. The sinker bar 44 is carried at intervals along its length on arms 45. Each arm 45 is connected by a pivot pin 46 to a link 47 and by a pivot pin 48 to one arm of a bell crank lever 49. The link 47 is connected by a pivot pin 50 to the bracket 33 and the bell crank lever 49 is carried from the same bracket by a pivot pin 51. The second arm of the bell crank lever 49 is connected by a pivot pin 52 to a connecting rod 53. The connecting rod 53 is formed at its lower end with an eccentric strap 54 which surrounds an eccentric 55 fixed on the main driving shaft 8.

In operation the main driving shaft 8 is rotated by an electric motor which is not shown. The needles are reciprocated upwards and downwards by the eccentrics 12 operating through the connecting rods 11 and the rods 5. The tongues 13 are similarly reciprocated by the eccentrics 19.

As the secondary driving shaft 38 is rotated at twice the speed of the main driving shaft 8, the eccentric 37 moves the connecting rod 35 upwards and downwards at twice the frequency at which the needles and tongues move upwards and downwards. The connecting rod 35 oscillates the bell crank lever 29 which in turn moves the arm 27 to and fro from left to right and right to left as seen in Figure 4 from the front to the back of the row of needles 1.

An eccentric 55 moves the connecting rod 53 upwards and downwards and this in turn oscillates the bell crank lever 49 which moves the arm 45 to and fro from left to right and right to left so that the sinkers 41 are also moved to and fro and the nebs 43 are moved into and out of engagement between the needles 1 or between the warp threads running from the guides 20, 21, 22 to the needles 1.

Figure 6:
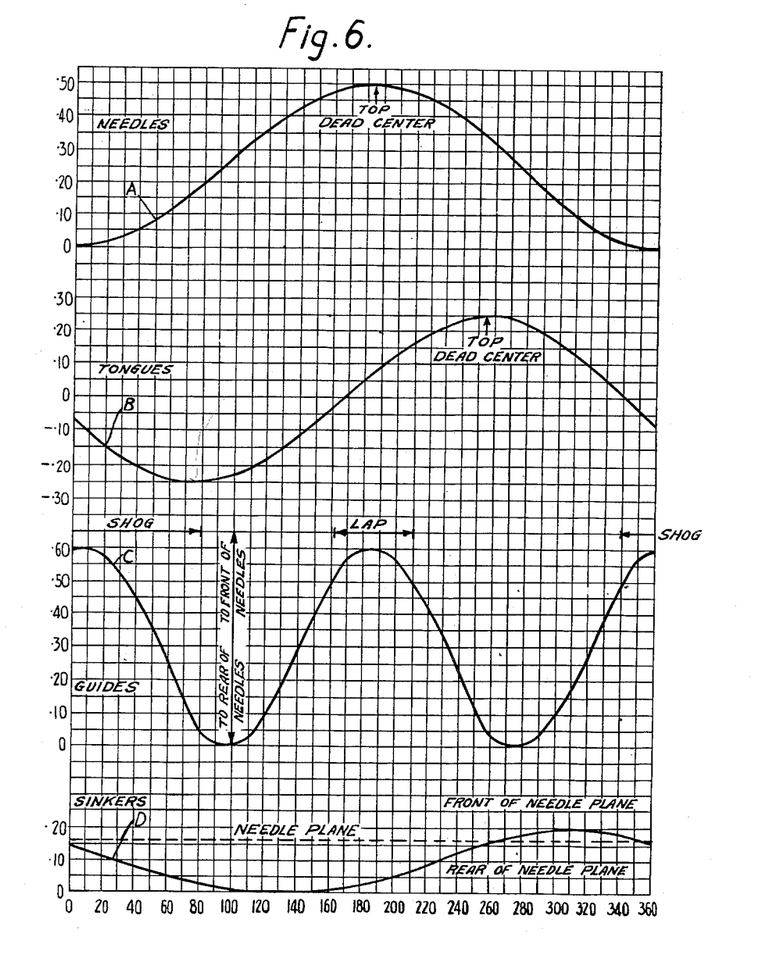
Figure 6 is a diagram showing the curves of movement of the knitting elements.

The relative angular positions of the various eccentrics driving all the knitting elements are adjusted so that the elements perform the curves of movement seen in Figure 6.

In Figure 6, the abscissae of each curve are plotted in terms of the degrees through which the drive shaft has rotated during any one cycle of operations and the ordinates show the departure of the particular element from a zero position in terms of inches. Curve A shows the vertical movement of the needles during one complete knitting cycle; curve B the vertical movement of the tongues; curve C the horizontal movement of the guides transversely to the row of needles, and curve D the horizontal movement of the sinkers which is also transverse to the row of needles. The machine performs one knitting cycle during each revolution of the main driving shaft 8, and the curves A, B, C and D are plotted to a base of the angular movement of the shaft 8 through one complete revolution starting when the eccentric 12 which drives the needles 1 is in its bottom dead centre position. The eccentric 12 has an eccentricity of 0.25" so that the amplitude of the needle movement is 0.5". The eccentricity of the eccentric 19 which drives the tongues is 0.25" so that the amplitude of the tongue movement is also 0.5". As will be seen from curve B in Figure 6 the tongue is at the bottom dead centre of its movement at 75° in the knitting cycle and with this relationship between the movement of the needles and tongues the hooks of the needles are closed from approximately 285° until just before the bottom dead centre of the needle movement. The guide eyes move along a slightly inclined line and the lengths of the parts of the arm 27 on each side of the pivot pin 28 relative to each other and also the relative lengths of the upright arm of the bell-crank lever 29 and the link 31 are so arranged that this line is substantially straight. As will be seen from curve C they are at the dead centre of their movement in front of the needles at 5° and again at 185° in each cycle. As is seen in curve D of Figure 6, the sinkers 41 which also move substantially horizontally on the arms 45 are at the limit of their movement between the needles so that the nebs 43 are in full engagement between the warp threads at 140° and are fully withdrawn to the front of the needles at 320°. The needles are cleared by the nebs 43 to allow casting-off to take place at approximately 280° or 290° in each cycle.

Figure 7:
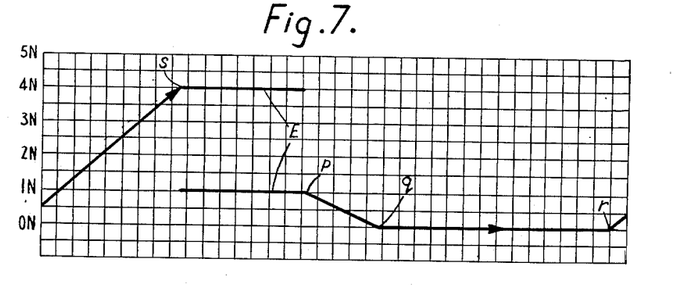
Figure 7 is a diagram showing curves of the lapping and shogging movement of the warp guides.
Figures 10A, 10B:
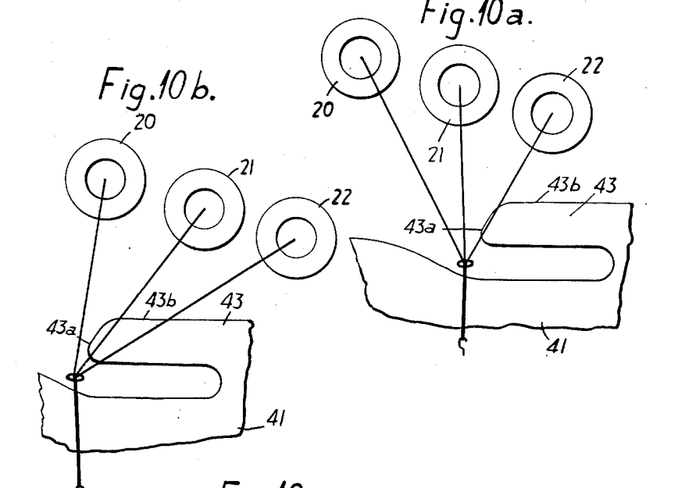
Figures 10(a)–10(g) are diagrams showing the relative positions of the warp guide eyes and needle hook, with the positions of the warp threads between the guide eyes and the hook relative to the neb of a sinker during successive stages of the knitting cycle whilst the shogging movement of the warp guide eyes is taking place.
Figures 10C, 10D:
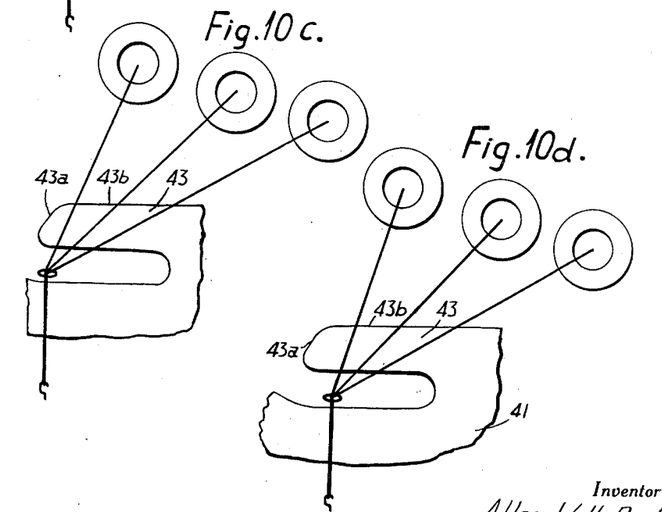
Figures 10E, 10F, 10G:
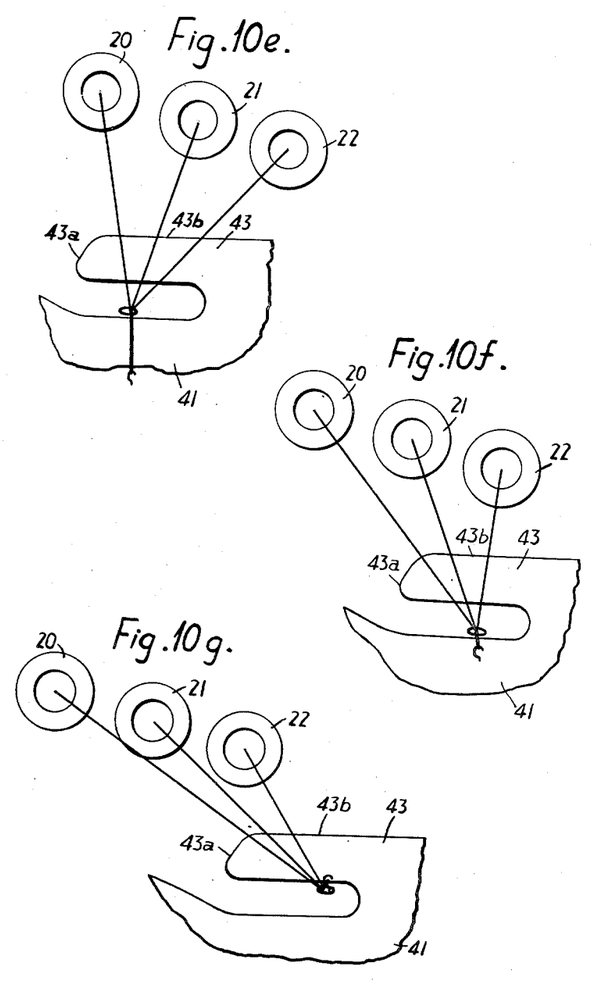

The longitudinal lapping and shogging movements of the guide eyes along the row of needles is shown in Figure 7. Curve E represents the shogging and lapping movements for a conventional fabric and curves F and G show a modification to the shogging and lapping movements which the guides make when knitting net fabrics having some stitches forming open loop pillars. When performing the movement of the curves F and G the guide eyes make a lapping movement backwards or forwards across the one needle in every knitting cycle and also make two shogging movements, one whilst the guides are in front of the needles and an additional shogging movement whilst the guide eyes are behind the needles. This additional movement occurs earlier in the knitting cycle than the shogging movement of the guide eyes whilst the guides are in front of the needles. When the guide eyes are caused to move as shown in curve E each guide eye first makes a lapping movement across the front of one needle between the points $p$ and $q$. This occurs between 161° and 210° of the knitting cycle, when, as will be seen from Figure 6 the guide eyes are at the limit of their movement to the front of the needles, and the needles are passing through their top dead centre position. The guides then make a shogging movement between the points $r$ and $s$ on curve E which is between 350° in one knitting cycle and 86° in the next cycle. The shogging movement in the example shown by curve E takes place across four needles and during this time it will be seen that the guides are again passing through the limit of their movement to the front of the needles and that the sinkers are moving from their position in which the nebs are in front of the needles into engagement between the warp threads. The actual relationship between the positions of the warp guide eyes, the needles, and the threads lying between the guide eyes of the needles, and the sinker nebs are shown successively in Figures 10(a) to 10(g). Figure 10(a) shows the positions at 320°; Figure 10(b) at 340°; Figure 10(c) 360° that is 0° in the next cycle; Figure 10(d) at 20°; Figure 10(e) at 40°; Figure 10(f) at 60°; and Figure 10(g) at 80°. In Figure 10(a) the guides are approximately in the centre of their path of travel and are moving towards the fronts of the needles, that is to the right, and the sinker nebs are at the limit of their movement, to the front of the needles. In Figure 10(b) the guides are still moving to the front of the needles and the sinker nebs have started to move towards the backs of the needles. The tip 43a of the nebs 43 is just completing its engagement between the threads passing through the guide eye 20. In Figure 10(c) the movement is continued. The shogging movement which starts at the point $r$ on curve E in Figure 7 starts midway between the positions shown in Figures 10(b) and 10(c), that is after the tips 43a of the nebs 43 have come into engagement between all three rows of warp threads. The shogging movement continues up to the point s which is just after the positions shown in Figure 10(g). At this stage of the cycle the neb 43 is still well in engagement between the warp threads. The warp threads therefore run obliquely accross the upper edges 43(b) of the nebs 43.

Thus, since the nebs 43 are already in engagement between the warp threads when the shogging movement takes place, it is impossible for the tips 43a of the nebs 43 to split the threads as they move towards the backs of the needles. It is also impossible for them to move into engagement between the wrong pairs of threads.

Figure 7A:
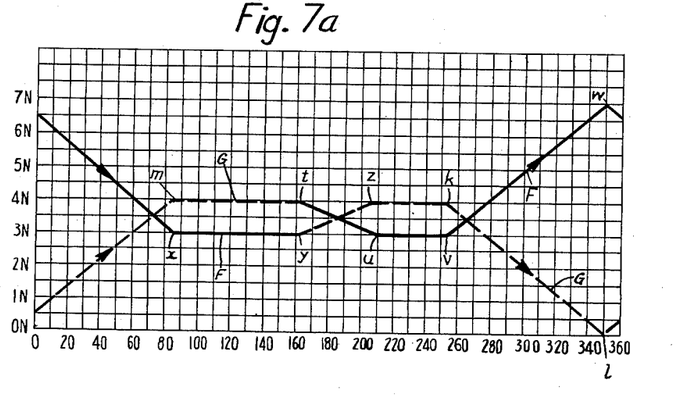
Fig. 7a is a diagram showing curves of the lapping and shogging movement of the warp guides when knitting net fabrics having stitches forming open loop pillars.
Figure 8:
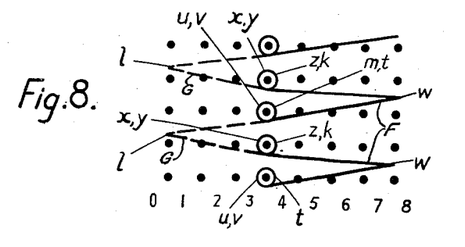

When knitting a fabric having stitches forming open loop pillars, one row of guide eyes makes shogging and lapping movements as shown by the curves F and G in Figure 7a. The path which a single warp thread takes when subjected to this movement is shown diagrammatically in Figure 8, each horizontal row of dots representing the same part of the row of needles in successive knitting cycles from the bottom towards the top. In Fig. 7a the solid line curve F corresponds to the portion of the path followed by the warp thread represented by the solid line in Fig. 8, and the dotted line curve G corresponds to the portion of this path represented by the dotted line in Fig. 8. Curves F and G consequently represent two parts of a single continuous path, and are not to be taken as representing separate or alternative paths. Thus starting at point t the guide eyes make a lapping movement across the front of the needle between spaces 4 and 3 up to the point u. This occurs between 161 and 205° of the knitting cycle, whilst the guides are again at the limit of their movement towards the front of the needles. This movement lays the yarn in the path from the point t—u, shown in Figure 8. Between v and w on curve F the guides make a shogging movement across four needles. At the start of this shogging movement, the nebs 43 of the sinkers are in engagement between the threads which, therefore, run obliquely from the upper edges of the nebs. At the limit of the sinker movement to the front of the needles at 320° the warp threads slip over the tips of the nebs which then immediately start their return movement, so that the threads lie under the lower edges of the nebs forming sinker wales. In the limiting position of the sinkers to the front of the needles, the nebs, being at front dead centre, momentarily have little movement and thus the warp threads are enabled to move cleanly around the tips of the nebs into engagement under the nebs so that there is no tendency for the nebs to split the warp threads or to engage between the wrong pairs of warp threads. The needles then (as seen on curve A of Fig. 6) approach their lowest point at 360°, and the stitch is cast off. Just before the 360° point is reached, a second shogging movement takes place between the point w on curve F and the point x on curve F. This is equal in length and opposite in direction to the shogging movement between v and w. During this second shogging movement the knitting elements are all in the same relative positions as they are during the shogging movement between r and s on curve E, that is as shown in Figures 10(a) to 10(g) so that the threads again run obliquely across the upper edges of the nebs. Between y and z on curve G the guide makes a further lapping movement across the front of the same needle (which has now risen again to its upper position) but in the opposite direction to that made between points t and u on curve F. A further shogging movement is then made between k and l in curve G which exactly corresponds to the shogging movement between v and w in curve F but is in the opposite direction. As the sinker nebs are withdrawn at 320° in this knitting cycle the sinker wales formed by the shogging movements between v and w and w and x in the previous cycle are cast off the sinker nebs and the loop in the thread thus caused is taken up by a spring tension bar on the knitting machine or by any other conventional means for absorbing fluctuations in the rate at which the warp threads are consumed. The final shogging movement takes place between the point l on curve G and the point m on curve G. The guides then return to their initial position at the point t on curve F. The points t to z and k to m are also shown on Figure 8 to indicate the corresponding points in the yarn path between the needles.

Figure 9:
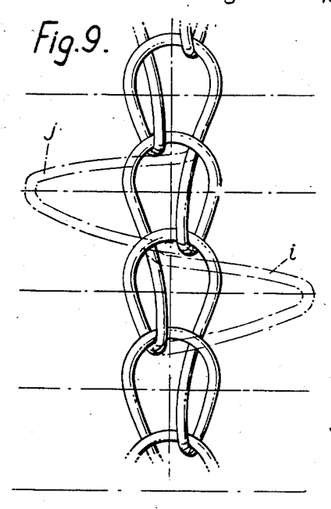
Figure 9 is an enlarged diagram showing a single chain of knitted pillar stitches.

Figure 9 shows diagrammatically a single chain of stitches formed by the warp guide movement represented by curves F and G. The portions of thread shown at i and j are the temporary sinker wales formed by the shogging movements between v and x and k and m respectively.

The warp guides 20, 21 and 22 shown in the drawings are conventional guide eyes which move transversely to the row of needles, between the needles when the needles are near their top dead centre positions and above the hooks when the needles are near their bottom dead centre positions. Alternatively, however, warp feeders may be used which move to and fro entirely above the needle hooks. Also fixed trick plates for casting off, and reciprocating holding down points may be substituted for the sinkers 41 having knock-over edges or verges 42 and nebs 43.

I claim:

1. A flat warp knitting machine of the type comprising a row of reciprocable needles each having a hook and a shank, means for periodically closing the open side of each hook, warp thread guide members for laying warp threads in the hooks of said needles and means for cyclically displacing said guide members lengthwise along said row of needles to perform a lapping movement and at least one shogging movement in each knitting cycle, sinker-like members for holding loops knitted by said needles down around the shanks thereof, a driving shaft connected to turn in timed relationship to said cyclic movement of said guide members, means operatively connecting said shaft to said needles and hook closing means for alternately opening and closing said hooks once during each knitting cycle, cyclically timed actuating means operatively connecting said driving shaft to said sinker-like holding down members to oscillate them transversely to said row of needles from a first position extending across the plane of movement of said needles while said hooks are open to a second position in front of said plane while said hooks are closed and back again to said first position once during each knitting cycle, and additional cyclically timed actuating means operatively connecting said driving shaft to said warp thread guide members to oscillate them transversely to said row of needles from a position in front of the plane of movement thereof to a position to the rear of said plane and back again to the front of said plane twice during each knitting cycle, said machine being characterized by the fact that said cyclically timed actuating means keep said warp thread guide members in front of said needles and said sinker-like holding down members near their first position while said lapping movement takes place and also when one shogging movement is initiated and while the major portion of said last mentioned movement takes place.

2. A flat warp knitting machine of the type comprising a row of reciprocable needles each having a hook and a shank, means for periodically closing the open side of each hook, warp thread guide members for laying warp threads in the hooks of said needles and means for cyclically displacing said guide members lengthwise along said row of needles to perform a lapping movement and a shogging movement in each knitting cycle, sinker-like members for holding loops knitted by said needles down around the shanks thereof, a driving shaft connected to turn in timed relationship to said cyclic movement of said guide members, means operatively connecting said shaft to said needles and hook closing means for alternately opening and closing said hooks once during each knitting cycle, cyclically timed actuating means operatively connecting said driving shaft to said sinker-like holding down members to oscillate them transversely to said row of needles from a first position extending across the plane of movement of said needles while said hooks are open to a second position in front of said plane while said hooks are closed and back again to said first position once during each knitting cycle, and additional cyclically timed actuating means operatively connecting said driving shaft to said warp thread guide members to oscillate them transversely to said row of needles from a position in front of the plane of movement thereof to a position to the rear of said plane and back again to the front of said plane twice during each knitting cycle, said machine being characterized by the fact that said cyclically timed actuating means keep said warp thread guide members in front of said needles and said sinker-like holding down members near their first position while said lapping movement takes place and also when said shogging movement is initiated and while the major portion of said shogging movement takes place.

3. A flat warp knitting machine of the type comprising a row of reciprocable needles each having a hook and a shank, means for periodically closing the open side of each hook, warp thread guide members for laying warp threads in the hooks of said needles and means for cyclically displacing said guide members lengthwise along said row of needles to perform one lapping movement and two shogging movements in each knitting cycle, sinker-like members for holding loops knitted by said needles down around the shanks thereof, a driving shaft connected to turn in timed relationship to said cyclic movement of said guide members, means operatively connecting said shaft to said needles and hook closing means for alternately opening and closing said hooks once during each knitting cycle, cyclically timed actuating means operatively connecting said driving shaft to said sinker-like holding down members to oscillate them transversely to said row of needles from a first position extending across the plane of movement of said needles while said hooks are open to a second position in front of said plane while said hooks are closed and back again to said first position once during each knitting cycle, and additional cyclically timed actuating means operatively connecting said driving shaft to said warp thread guide members to oscillate them transversely to said row of needles from a position in front of the plane of movement thereof to a position to the rear of said plane and back again to the front of said plane twice during each knitting cycle, said machine being characterized by the fact that said cyclically timed actuating means keep said sinker-like holding down members near their first position and keep said warp guide members in front of said needles while said lapping movement takes place and when one of said shogging movements is initiated and the major portion thereof takes place, but keep said warp thread guide members to the rear of said needles and said sinker-like holding down members near their second position when the other of said shogging movements takes place.

4. A flat warp knitting machine as claimed in claim 1 comprising an arm on which said guide members are mounted, a fixed member, and a pair of substantially vertical and parallel links, each link being pivotally attached at one end to said fixed member and at its other end to said arm.

5. A flat warp knitting machine as claimed in claim 4 comprising an eccentric driven by said drive shaft and a connecting rod connected between said eccentric and one of said links to rock said link.

6. A flat warp knitting machine as claimed in claim 1 in which the means for closing each needle hook is a reciprocating tongue and said timed actuating means comprise eccentrics performing oscillations of simple harmonic form.

References Cited in the file of this patent
UNITED STATES PATENTS
2,871,686 Porter ________________ Feb. 3, 1959